United States Patent [19]
Cheng

[11] Patent Number: 5,574,596
[45] Date of Patent: Nov. 12, 1996

[54] OPTICAL CIRCULATOR

[75] Inventor: Yihao Cheng, Kanata, Canada

[73] Assignee: JDS Fitel Inc., Nepean, Canada

[21] Appl. No.: 442,368

[22] Filed: May 16, 1995

[30] Foreign Application Priority Data

May 1, 1995 [CA] Canada ................... 2148317

[51] Int. Cl.⁶ ................................... G02B 5/30
[52] U.S. Cl. ................. 359/484; 359/483; 359/494; 359/495; 359/496; 359/497
[58] Field of Search .................... 359/281, 484, 359/495, 497, 496, 494, 283, 282; 385/11, 14, 33, 24, 28, 131; 372/703

[56] References Cited

U.S. PATENT DOCUMENTS

| | | | |
|---|---|---|---|
| 4,974,944 | 12/1990 | Chang | 359/484 X |
| 4,978,189 | 12/1990 | Blonder et al. | 385/11 X |
| 5,204,771 | 4/1993 | Koga | 359/281 |
| 5,212,586 | 4/1993 | Van Delden | 359/281 |
| 5,237,445 | 8/1993 | Kuzuta | 359/281 |
| 5,319,483 | 6/1994 | Krasinski et al. | 359/113 |
| 5,381,261 | 1/1995 | Hirai et al. | 359/282 |
| 5,428,695 | 6/1995 | Ohta | 385/11 X |
| 5,471,340 | 11/1995 | Cheng et al. | 359/281 |
| 5,499,307 | 3/1996 | Iwatsuka | 385/11 |

*Primary Examiner*—Brian Healy
*Attorney, Agent, or Firm*—Neil Teitelbaum & Associates

[57] ABSTRACT

The optical circulator according to the present invention comprises two birefringent crystal end-plates, non-reciprocal Faraday rotators inserted between birefringent crystal plates, and a pair of matched birefringent crystal plates disposed between the rotators. The first birefringent crystal end-plate functions as a dividing and combining means for dividing a beam into two beams of orthogonal electric field vectors from different paths into one on the same path. The pair of matched birefringent crystal plates serve as beam path determining means shifting a beam to a different direction depending on the direction of the electric field vector and the propagation. The pair of crystal plates are substantially identical but oppositely oriented, such that the pair of means have opposite beam shifted directions.

12 Claims, 7 Drawing Sheets

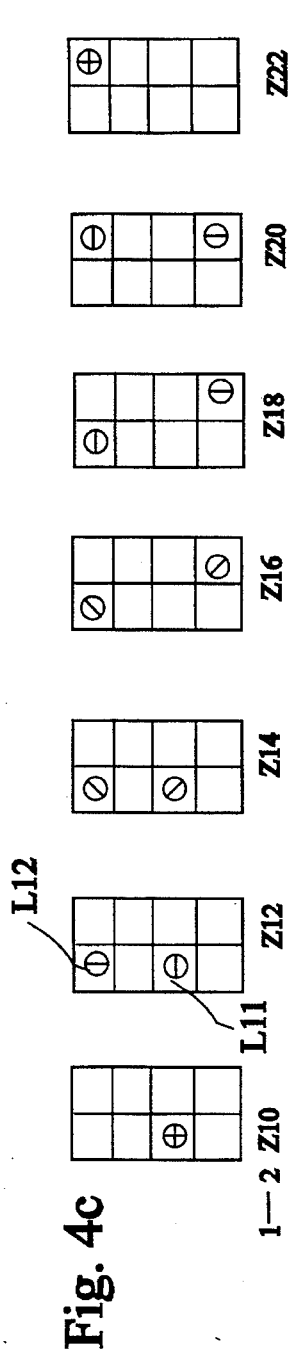
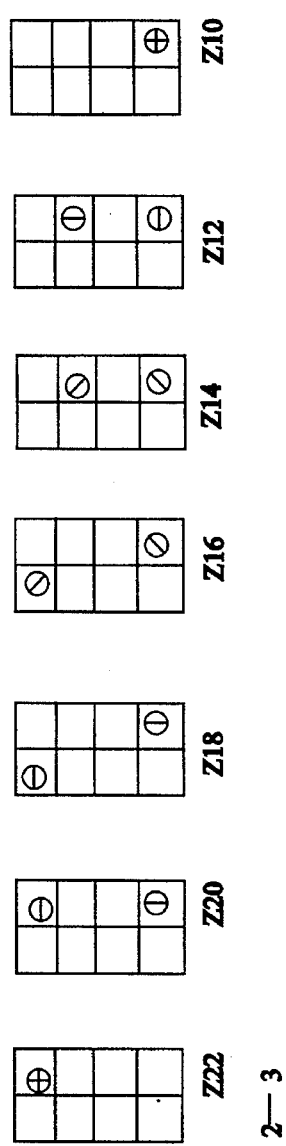
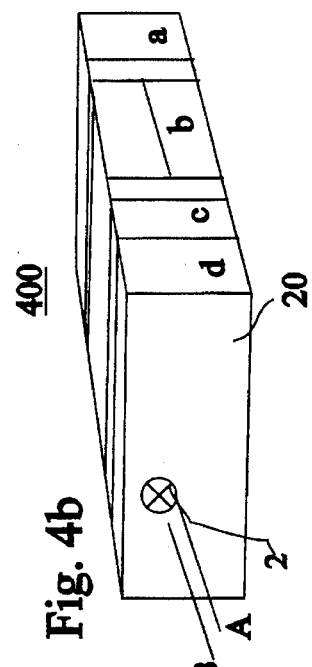
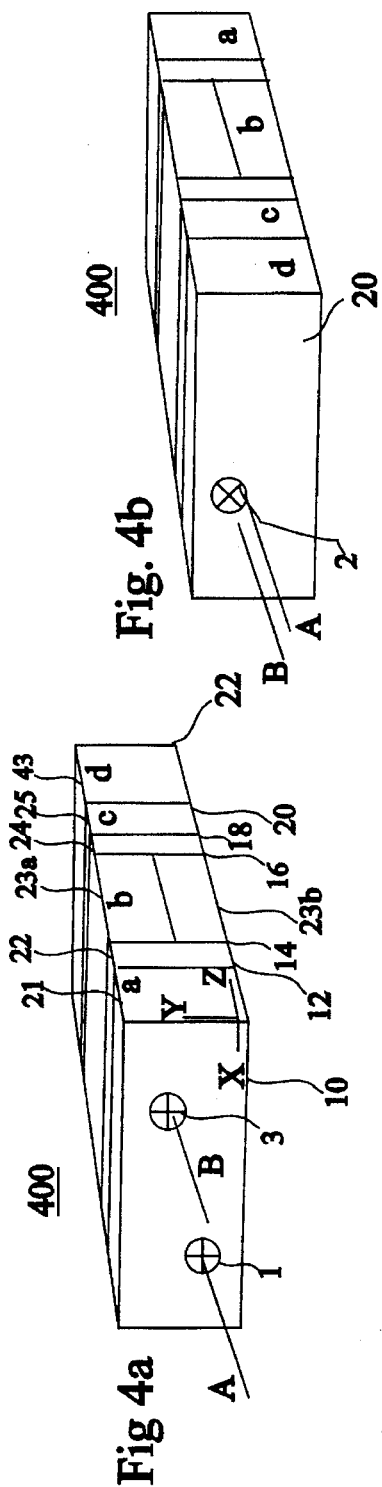
Fig. 4c
Fig. 4d
Fig. 4a
Fig. 4b

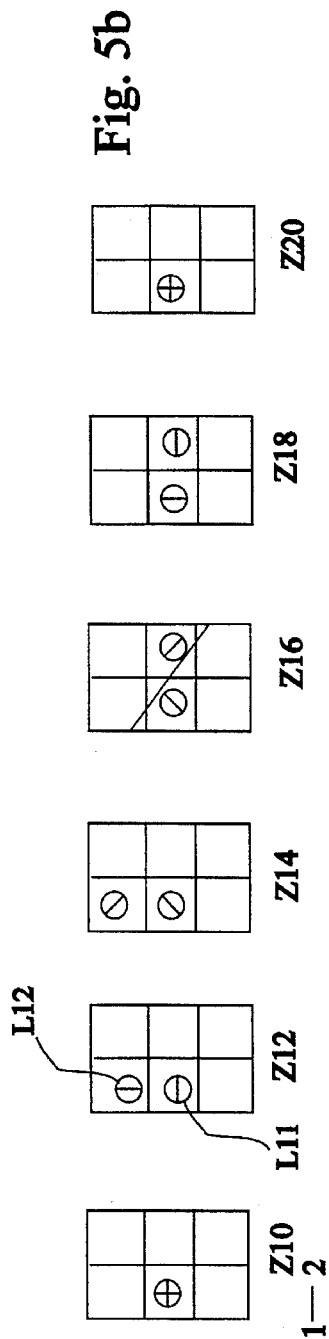

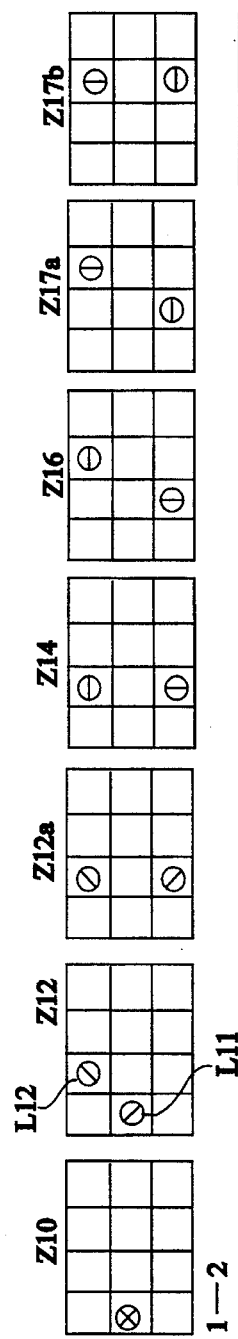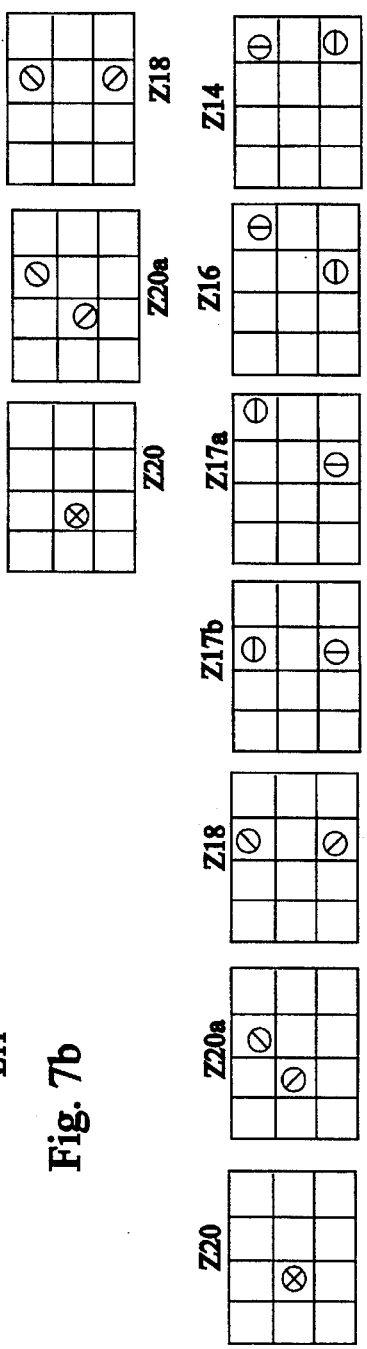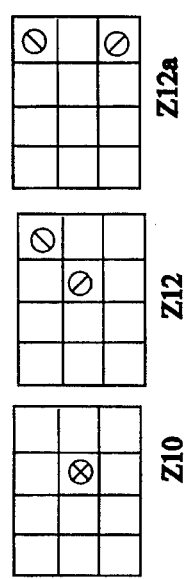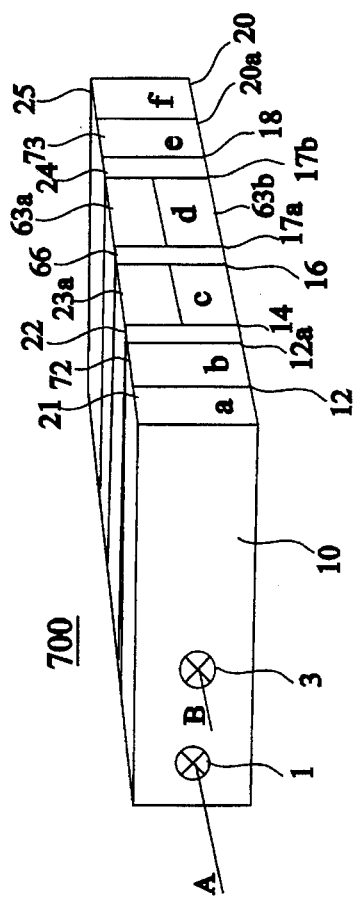
Fig. 7b
Fig. 7c
Fig 7a 4,574,596

OPTICAL CIRCULATOR

FIELD OF THE INVENTION

The present invention relates to an optical circulator for use in optical communications.

BACKGROUND OF THE INVENTION

A practical way to double the bit carrying capacity of an existing unidirectional fiber optic communication link is by the use of optical circulators. An optical circulator is a passive, non-reciprocal device which permits full duplex communication on a single fiber optic link. Thus, a typical fiber optic communication link operating on two fibers can be quickly and economically converted to a bi-directional, single fiber communication link by installing an optical circulator at each end of the link.

One of the major advantages of optical circulators over more traditional 3 dB couplers is that the loss penalty is much lower. Using a 3 dB coupler at each end of a fiber link, there is an insertion loss of at least 6 dB. For connections which operate near their detection limits, this additional 6 dB loss could make bi-directional communication impracticable.

In a real optical circulator insertion loss and cross-talk are two important considerations. Insertion loss is the difference in power between light launched into the optical circulator and the power that exits the device. Insertion loss is largely due to absorption of light and to imperfect polarization separation.

Prior art optical circulators are described in U.S. Pat. No. 4,650,289, issued to Kuwahara; U.S. Pat. No. 4,464,022, issued to Emkey; and in U.S. Pat. No. 4,859,014, issued to Schmitt et at. However, insertion loss and/or cross-talk in optical circulators made as described in these references are unacceptably high for many communications applications. Therefore, a need exists for an optical circulator having lower insertion loss and cross-talk than that found in present optical circulators.

One factor that contributes to lower insertion loss and cross-talk in the optical circulator of the present invention than in prior optical circulators is the use of birefringent crystals instead of traditional polarization spitting cubes results in much more complete polarization of incident, randomly polarized light.

A more recent prior art optical circulator that uses birefringent crystals in contact with other elements such as polarization rotators, is U.S. Pat. No. 5,204,771 issued Apr. 20, 1993 in the name of Koga. Although this invention appears to perform its intended function adequately, precise matching of optical components such as waveplates is required; this precision matching is found to be difficult and thus costly. This requirement of matching reciprocal rotators is obviated in the present invention which overcomes this problem by utilizing a centrally disposed split pair of birefringent crystal plates.

It is therefore an object of the invention, to overcome many of the limitations of known prior art devices.

SUMMARY OF THE INVENTION

In accordance with the invention, there is provided, an optical circulator comprising: first means for separating a beam of light into two polarized beams having orthogonal polarization states, and for combining two separated orthogonally polarized beams; second means for separating a beam of light into two polarized beams having orthogonal polarization states, and for combining two separated orthogonally polarized beams; a pair of substantially identical oppositely oriented birefringent crystal plates oriented to shift one of two orthogonally polarized beams in a first direction and the other of the two orthogonally polarized beams in a second direction, said means being disposed intermediate the first and second separating and combining means; and, a pair of nonreciprocal polarization rotating means, one means in said pair being disposed between the pair of birefringent crystal plates and one of said separating and combining means, the other means in said pair of non-reciprocal polarization rotating means being disposed between the other of said separating and combining means and said pair of birefringent crystal plates.

In accordance with the invention there is further provided, an optical circulator for transmitting lights from incoming and outgoing ports circularly, comprising: a first dividing and combining means for dividing a beam into two beams of orthogonal electric filed vectors and for combining two beams from different paths into one on the same path; a pair of beam path determining means adjacently coupled for introducing a beam to a different direction depending on the direction of the electric filed vector and the propagation, each means in said pair being substantially identical but oppositely oriented, such that the pair of means have opposite beam shifting directions; a second dividing and combining means for dividing a beam into two beams of orthogonal electric field vectors and for combining two beams of orthogonal electric filed vectors from different paths into one on the same path, said first dividing and combining means, said beam path determining means and said second dividing and combining means being optically coupled to allow light to propagate from the first dividing and combining means to the beam path determining means and to the second dividing and combining means; a first polarization rotation means between said first dividing and combining means and said beam path determining means for rotating two orthogonal polarization vectors in a same direction and maintaining an orthogonal relationship; and, a second polarization rotating means between said beam path determining means and said second dividing and combining means for rotating two orthogonal polarization vectors in a same direction to maintain thereby maintaining an orthogonal relationship.

BRIEF DESCRIPTION OF THE DRAWINGS

Exemplary embodiments of invention will be described in conjunction with the drawings, in which:

FIG. 2b is a perspective view from another end of the optical circulator shown in FIG. 2a;

FIG. 3b is a perspective view from another end of the optical circulator shown in FIG. 3a;

3

Figure 3C:
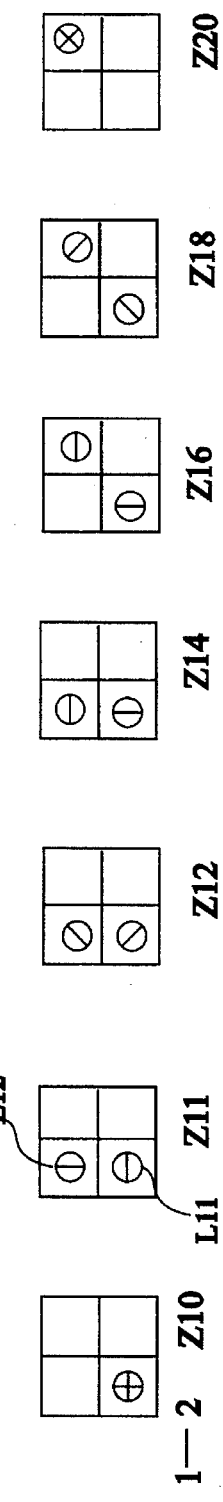
FIG. 3c is a drawing showing polarized light in a path A according to the second embodiment of the invention.
Figure 3D:
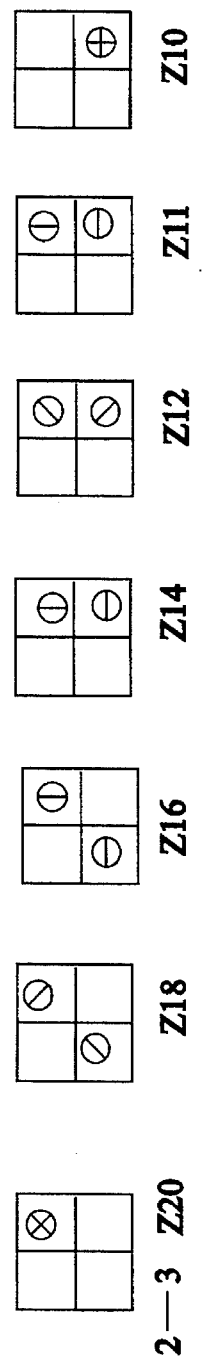
Figure 3B:
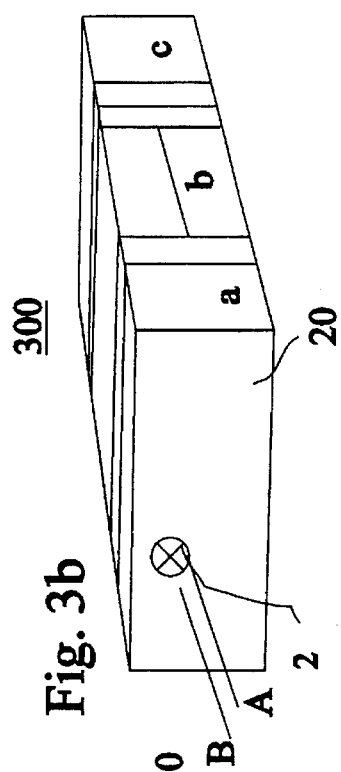
Figure 6B:
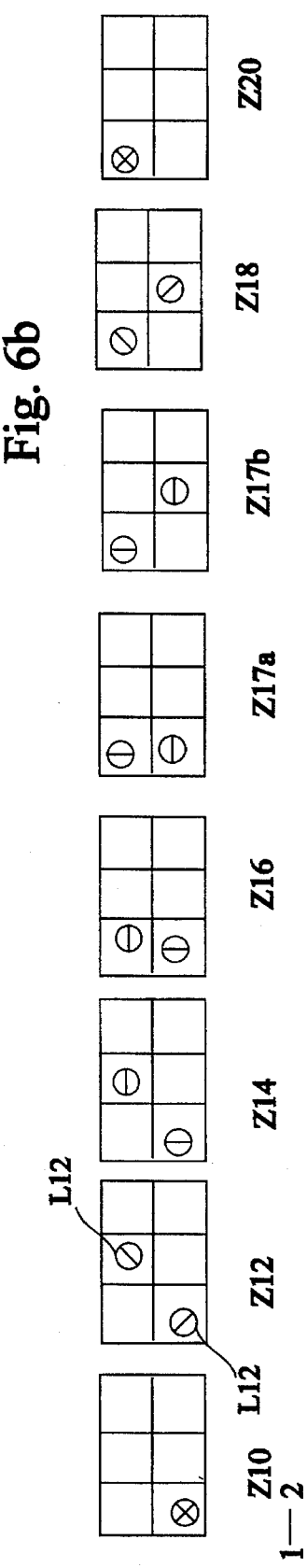
Figure 6C:
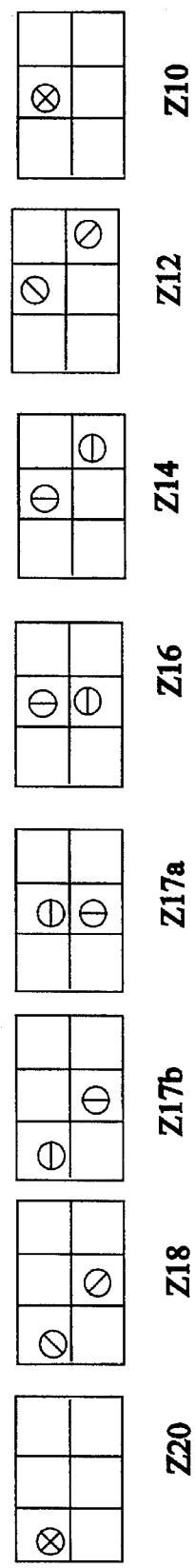
Figure 6A:
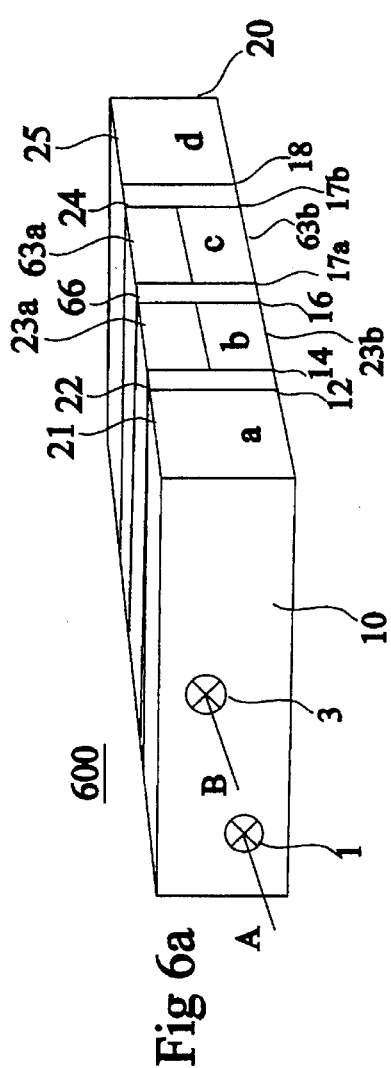

FIG. 3d is a drawing showing polarized light in a path B according to the second embodiment of the invention;

FIG. 4a is a perspective view showing a third embodiment of an optical circulator of the present invention;

FIG. 4b is a perspective view from another end of the optical circulator shown in FIG. 4a;

FIG. 4c is a drawing showing polarized light in a path A according to the third embodiment of the invention;

FIG. 4d is a drawing showing polarized light in a path B according to the third embodiment of the invention;

FIG. 5a is a perspective view showing a fourth embodiment of an optical circulator of the present invention;

FIG. 5b is a drawing showing polarized light in a path A according to the fourth embodiment of the invention;

FIG. 5c is a drawing showing polarized light in a path B according to the fourth embodiment of the invention;

FIG. 6a is a perspective view showing a fifth embodiment of an optical circulator of the present invention;

FIG. 6b is a drawing showing polarized light in a path A according to the fifth embodiment of the invention;

FIG. 6c is a drawing showing polarized light in a path B according to the fifth embodiment of the invention;

FIG. 7a is a perspective view showing a sixth embodiment of an optical circulator of the present invention;

FIG. 7b is a drawing showing polarized light in a path A according to the sixth embodiment of the invention; and, FIG. 7c is a drawing showing polarized light in a path B according to the sixth embodiment of the invention.

DETAILED DESCRIPTION

Figure 1:
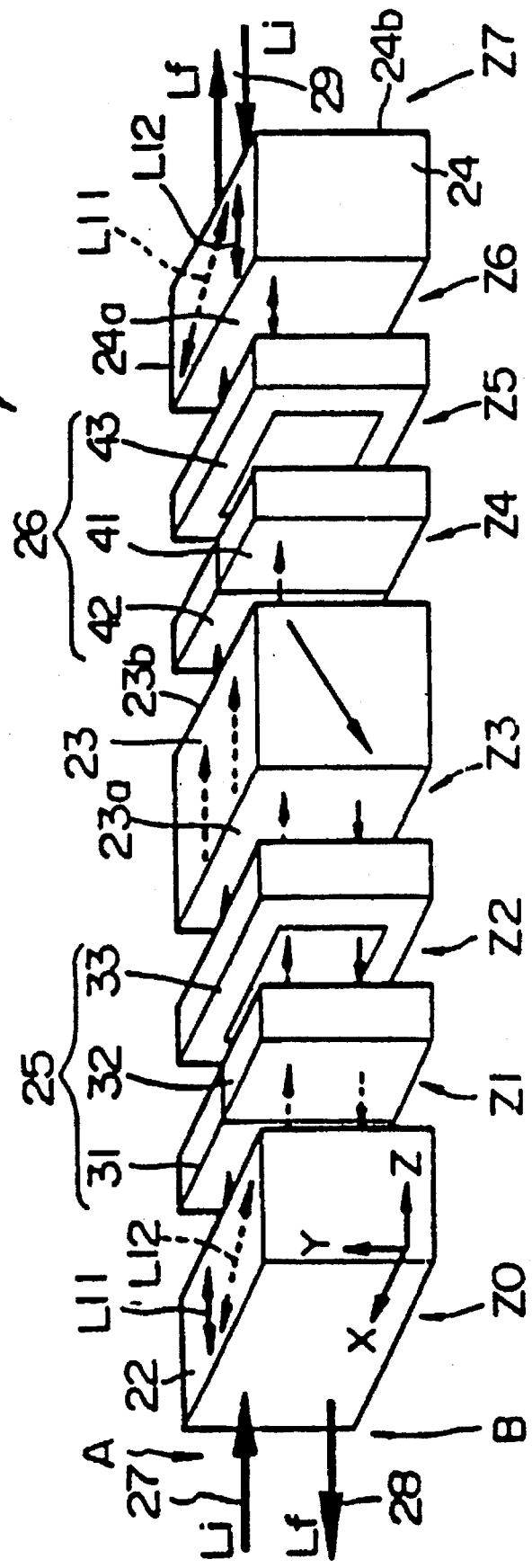
FIG. 1 is a prior art is a perspective view showing an optical non-reciprocal optical circulator.

Turning now to FIG. 1, a prior art optical circulator 21 is constructed of a first through third double refraction crystal plates 22 through 24 disposed along the proceeding direction of light with a predetermined interval; a rotator 25 of the first group inserted between the first double refraction crystal plate 22 and the second refracted crystal plate 23; a rotator 26 of the second group inserted between the second double refraction crystal plate 23 and the third refracted crystal plate 24; light incoming and outgoing ports 27 and 28 disposed on the first double refraction crystal plate 22; and a light incoming and outgoing port 29 disposed on the third double refraction crystal plate 24. The rotator 25 of the first group consists of reciprocal and non-reciprocal rotators that rotate electric field vibration directions of light up to an identical angle; a first reciprocal rotator 31 rotates clockwise to 45 degrees, and a first reciprocal rotator 32 rotates counterclockwise to 45 degrees, and a first non-reciprocal rotator 33 rotates to 45 degrees.

Disadvantages have been found in manufacturing this device 21. For instance, a high level of accuracy is required in matching the rotators 31 and 32;

The rotator 26 of the second group is constructed similarly to rotator 25 of the first group, comprising a second reciprocal rotator 41 rotating clockwise to 45 degrees, a second reciprocal rotator 42 rotating counterclockwise to 45 degrees, and a second non-reciprocal rotator 43 rotating to 45 degree. As with the rotators 31 and 32, 41 and 42 must be matched to within a high level of accuracy; such precision matching of elements tends to be difficult to achieve and as a result increases the cost of manufacturing the device.

The various embodiments of the present invention described hereafter overcome this limitation.

A First Embodiment

The first embodiment of the optical circulator of this invention is described with reference to FIGS. 2a to 2d. Reference numerals assigned to elements in the prior art device shown in FIG. 1 and those assigned to elements in the following embodiments shown in FIGS. 2 to 7 do not intentionally correspond to same elements.

The optical circulator 200 is constructed of a first through fourth double refraction crystal plates 21, 23a, 23b, and 25 disposed along the proceeding direction of light with a predetermined interval. Plates 21 and 25 will hereafter be referred to as end-plates; plates 23a and 23b will be referred to as central-plates. Plate 21 is "a" units wide, plates 23a and 23b are "b" units wide, and plate 25 is "c" units wide; where a=c and b=$\sqrt{2}$a. A non-reciprocal rotator 22 is inserted between the first crystal end-plate 21 and central-plates 23a and 23b. A second non-reciprocal rotator 24 is interposed between the second end-plate 25 and the central-plates 23a and 23b. Light incoming and outgoing ports 1 and 3 are disposed on outwardly facing endface 10 of the first crystal end-plate 21, and a light incoming and outgoing port 2 is disposed on an outwardly facing endface 20 of crystal end-plate 25. The rotators 22 and 24 in the form of Faraday rotating elements rotate electric field vibrations of light up to an identical angle of 45°.

The operation of the optical circulator will be explained with reference to FIGS. 2a to 2d. The positive direction of the Z-axis is the direction that goes from the side of the light incoming and outgoing ports 1 and 3 to the side of the light incoming and out going ports 2, this direction being from front left to rear right in FIG. 2a. The direction from bottom to top is the forward direction of the Y-axis.

Calcite or rutile crystals are preferably used for the above double refraction crystal plates. The non-reciprocal rotators 22 and 24 are preferably Faraday rotating elements using Y.I.G crystal or Bi-added thin film crystals. The composition of the Bi-added thin film crystals include a combination of, for example, $(YbTbBi)_3Fe_5O_{12}$ and $(GdBi)_3(GeAlGa)_5O_{12}$, or of Y.I.G. and $Y_{3-x}Bi_xFe_5O_{12}$.

In this embodiment, the direction that separates ordinary light and extraordinary light in the double refraction crystal plates 21, 23a, 23b and 25 is set so that the direction that the central plates differs from the directions of the first and last end-plates 21 and 25 respectively.

Figure 2C:
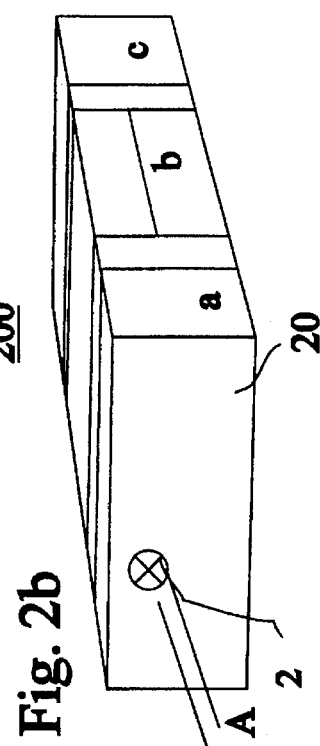
FIG. 2c is a drawing showing polarized light in a path A according to the first embodiment of the invention.
Figure 2D:
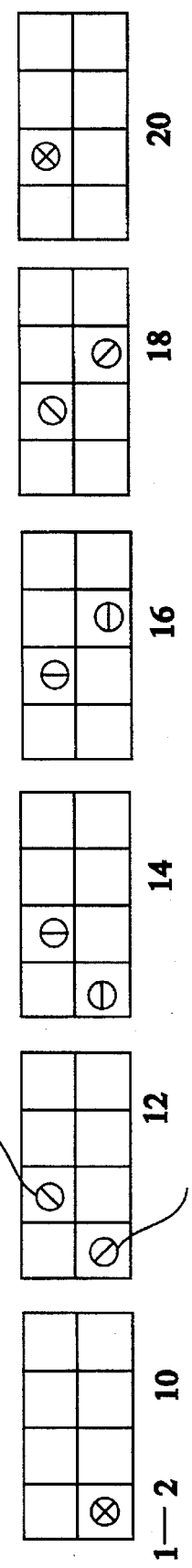
FIG. 2d is a drawing showing polarized light in a path B according to the first embodiment of the invention.
Figure 2A:
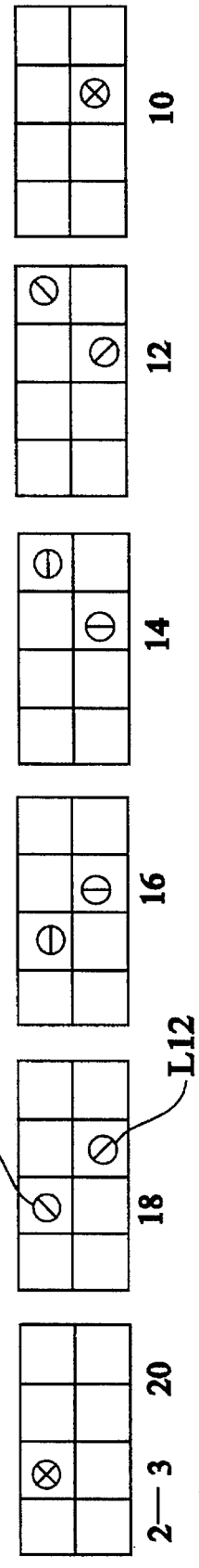
FIG. 2a is a perspective view showing a first embodiment of an optical circulator of the present invention.

Next operations of the optical circulator 200 are explained. FIG. 2a is a view of polarized light in a path A going from the light incoming and outgoing port 1 to the light incoming and outgoing port 2 as viewed from the side of the incoming light. ( the side of the incoming and outgoing port 1). States Z10, Z12, Z14 through Z20 are indicated in FIGS. 2c and 2d and coincide with endfaces 10, 12 through 20 in FIG. 2a, traveling along the Z-axis. Light injected from the light incoming and outgoing port 1, is in a state Z10 and is separated into light L11 and light L12 on the X-Y plane by a first double refraction crystal plate 21. The light L11 is ordinary light (O-ray) relative to the first double refraction crystal plate 21 and light L12 is extraordinary (E-ray). The light is polarized at right angles and vibrates along a 45 degree axis to the X and Y directions as shown by Z12. The electric field vibration of light L11 and light L12 which are perpendicular to each other, proceed in the same direction as a result of the light L11 and L12 passing through the non-reciprocal Faraday rotator 22. The state of the polarization at this time is shown by Z14; L11 and L12 having been rotated 45 degrees by 22, L11 at Z14 is oriented horizontally along the X-axis and L12 is oriented vertically along the Y-axis. The double refraction central-plates 23a and 23b are so arranged that the light L11 is shifted by 23b, L12 passing through 23a unchanged at endface 16 shown by state Z16. Next nonreciprocal rotator 24 rotates both L11 and L12 by 45 degrees in a clockwise direction shown by state Z18. The vibrations of the two lights L11 and L12 cross at the injection edge face 18 of the fourth double refraction crystal plate 25 where they are combined at port 2 on face 20 illustrated by state Z20.

Figure 2B:
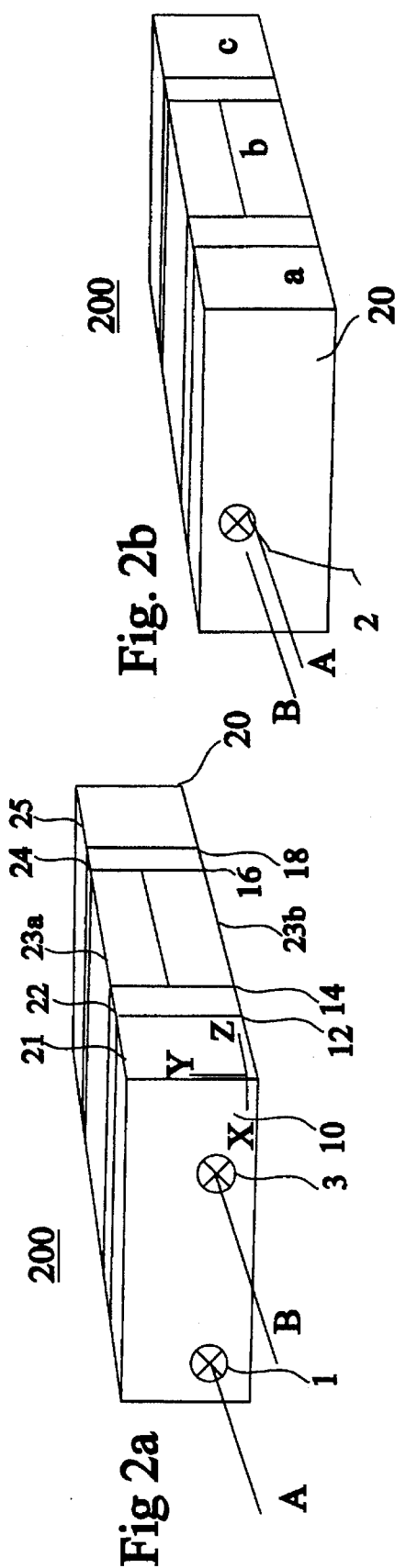

Next, referring to FIGS. 2b and 2d polarized light at light path B going from the light incoming and outgoing port 2 to the light incoming and outgoing port 3 as viewed from the side of the outgoing light (the side of the light incoming and outgoing port 3). The light injected from the light incoming and outgoing port 2 is in a Z20 state, and is separated into light L11 and light L12 on the X-Y plane by the fourth double refraction crystal plate 25. The light L11 is ordinary light (O-ray) relative to the fourth double refraction crystal plate 25, and the light L12 is extraordinary light (E-ray). Each light is polarized at fight angles, vibrating 45 degrees to the X and Y axes as shown by Z18. Thereafter, the two lights L11 and L12 (in state 18) will pass through the non-reciprocal Faraday rotator 24 being rotated in the same counter clockwise direction as in its previous path from endface 16 to endface 18. Thus lights L11 and L12 will have the direction of polarization rotated clockwise by 45 degrees. After passing through the rotator 24 the lights L11 and L12 shown by state Z16 are horizontal and vertically oriented. The horizontal beam L11 becomes shifted by crystal 23a and L12 passes through unchanged as seen at endface 14 in state Z14. Faraday rotator 22 rotates both beams clockwise by 45 degrees seen in state Z12; and the beams are combined at port 3 which is disposed in a different location from port 1, by crystal 21 at endface 10 illustrated in state Z10.

As explained above, according to this optical circulator 200, a non-reciprocal circuit can be realized such that the light injected from the light incoming and outgoing port 1 will pass out from the light incoming and outgoing port 2, and the light injected from the light incoming and outgoing port 2 will not pass out from the light incoming and outgoing port 1, but from the light incoming and outgoing port 3.

The Second Embodiment

Figure 3A:
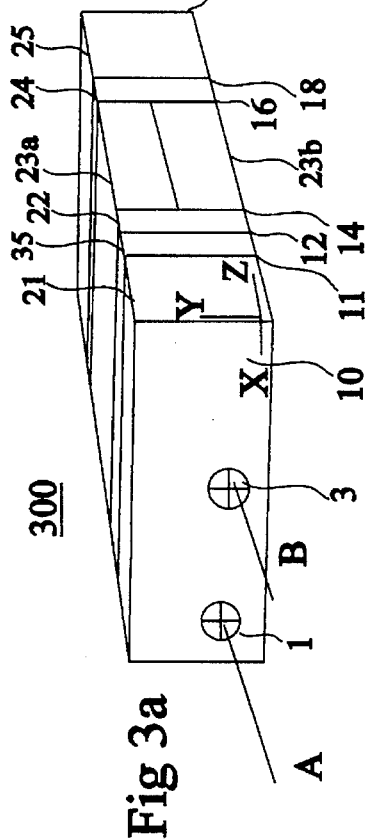
FIG. 3a is a perspective view showing a second embodiment of an optical circulator of the present invention.

Next, an explanation is given of an optical circulator according to the second embodiment of the present invention, with reference to FIGS. 3a, 3b, 3c, and 3d. FIG. 3a is a view of polarized light in a path A going from the light incoming and outgoing port 1 to the light incoming and outgoing port 2 as viewed from the side of the incoming light. ( the side of the incoming and outgoing port 1 ). These states Z10, Z11, Z12, Z14 through Z20 are indicated in FIGS. 3c and 3d and coincide with endfaces 10, 11, 12 through 20 in FIG. 2a, traveling along the Z-axis. Light injected from the light incoming and outgoing port 1, is in a state Z10 and is separated into light L11 and light L12 on the X-Y plane by a first double refraction crystal plate 21. The light L11 is ordinary light (O-ray) relative to the first double refraction crystal plate 21 and light L12 is extraordinary (E-ray). The light is polarized at right angles and vibrates in the X and Y directions as shown by Z11. The electric field vibration of light L11 and light L12 which are perpendicular to each other, proceed in the same direction as a result of the light L11 and L12 passing through the reciprocal rotator in the form of a waveplate 35. The state of the polarization at this time is shown by Z12; L1 and L2 having been rotated 45 degrees clockwise by 35, lights L11 and L12 then pass through a Faraday rotator 22 and are rotated a further 45 degrees clockwise. L12 at Z14 is oriented horizontally along the X-axis and L11 is oriented vertically along the Y-axis. The state of the polarization at this time is shown by Z14; The double refraction central-plates 23a and 23b are so arranged that the light L12 is shifted by 23b, L11 passing through 23a unchanged at endface 16 shown by state Z16. Next, non-reciprocal rotator 24 rotates both L11 and L12 by 45 degrees in a clockwise direction shown by state Z18. The vibrations of the two lights L11 and L12 cross at the injection edge face 18 of the fourth double refraction crystal plate 25 where they are combined at port 2 on face 20 illustrated by state Z20. As in the first embodiment, the plate 21 is "a" units wide, plates 23a and 23b are "b" units wide, and plate 25 is "c" units wide; where a=b and c=√+e,fra 2+ee a.

Next, light injected from the light incoming and outgoing port 2 following a path B, is in a state Z20 is separated into light L11 and light L12 on the X-Y plane by a fourth double refraction crystal plate 25. The light L12 is ordinary light (O-ray) relative to the fourth double refraction crystal plate 25 and light L11 is extraordinary (E-ray). The light is polarized at fight angles and vibrates at 45 degrees to the X and Y directions as shown by Z18. The electric field vibration of light L11 and light L12 which are perpendicular to each other, proceed in the same direction as a result of the light L11 and L12 passing through the non-reciprocal Faraday rotator 24. The state of the polarization at this time is shown by Z16;. The double refraction central-plates 23a and 23b are so arranged that the horizontally oriented light L11 is shifted by 23b, L12 passing through 23a unchanged at endface 14 shown by state Z14. After passing through non-reciprocal Faraday rotator 22, L11 and L12 are rotated 45 degrees; L11 and L12 at Z12 are oriented 45 degrees off the X-Y axes. Reciprocal rotating waveplates 35 rotate L11 and L12 counter clockwise so that L11 is horizontal and L12 is vertical along the X and Y axes respectively illustrated by state Z11. The two lights are combined by the first crystal plate 21 shown by state Z10.

The Third Embodiment

Referring now to FIGS. 4a through 4d, the third embodiment of the invention is shown. FIG. 4a is a view of polarized light in a path A going from the light incoming and outgoing port 1 to the light incoming and outgoing port 2 as viewed from the side of the incoming light. ( the side of the incoming and outgoing port 1 of circulator 400). States Z10, Z11, Z12, Z14 through Z20 are indicated in FIGS. 4c and 4d and coincide with endfaces 10, 11, 12 through 20 in FIG. 2a, traveling along the Z-axis. Light injected from the light incoming and outgoing port 1, is in a state Z10 and is separated into light L11 and light L12 on the X-Y plane by a first double refraction crystal plate 21. The light L11 is ordinary light (O-ray) relative to the first double refraction crystal plate 21 and light L12 is extraordinary (E-ray). The light is polarized at right angles and vibrates in the X and Y directions as shown by Z11. The electric field vibration of light L11 and light L12 which are perpendicular to each other, proceed in the same direction as a result of the light L11 and L12 passing through the non-reciprocal rotator in the form of a Faraday rotator 22. The state of the polarization at this time is shown by Z14; L1 and L2 having been rotated 45 degrees clockwise by 22 then pass through the double refraction central-plates 23a and 23b; the plates are so arranged that the light L11 is shifted by 23b, L12 passing through 23a unchanged at endface 16 shown by state Z16. Next, a fourth double refraction crystal plate 25 is oriented to shift L12, L11 passing through unchanged shown by state Z20. Next, the vibrations of the two lights L11 and L12 cross at the injection edge face 20 of the fifth double refraction crystal plate 43 where they are combined at port 2 on face 22 illustrated by state Z22. The plate 21 is "a" units wide, plates 23a and 23b are "b" units wide, plate 25 is "c" units wide; and plate 43 is "d" units wide where d=a+c and b=√2a.

The states of lights L11 and L12 along path B from port 2 to port 3 are clearly illustrated in FIG. 4d.

The Fourth Embodiment

With the exception of the two double refraction crystal central-plates 23c and 23d being oriented differently from 23a and 23b in earlier embodiments, this circulator 500 is essentially the same as the circulator 200 shown and described with reference to FIGS. 2a, 2b, 2c, and 2d.

Referring now to FIGS. 5a, 5c, and 5d, the circulator 500 in 5a is shown having two double refraction central-plates 23c and 23d oriented 45 degrees to the X-Y axes. Thus, in operation, in states Z14 to Z16, light is directed differently by 23c and 23d than by 23a and 23b in device 200. The extraordinary component of light L12 is shifted 45 degrees to the X-Y axes in state Z16. The Faraday rotators and the end-plates function in a similar manner as they do in circulator 200, described heretofore. In this embodiment a=c and b=√2a.

The Fifth Embodiment

Referring now, to FIG. 6, light propagating through the circulator 500 suffers less from polarization mode dispersion (PMD) than in the circulators shown in the previous embodiments due to this circulator's symmetry. Improvements in PMD in the circulator 500 are a result of the two orthogonally polarized beams traveling along a same path length within the device; thus a=d and b=c; as well, a=d=√2b.

The operation of the circulator 600 can be understood with reference to FIGS. 6a, 6b, and 6c. The polarization states of light traveling from port 1 to port 2 at interfaces Z10 to Z20 are exemplified in FIG. 6b. The polarization states of light traveling from port 2 to port 3 at interfaces Z20 to Z10 are exemplified in FIG. 6c. It should be noted that in traversing state Z14 to Z16, L12 is shifted as same distance as L11 in traversing state Z17a to Z17b, thus the path length traveled by L11 is substantially the same as that for L12.

The Sixth Embodiment

In an alternative embodiment a circulator 700 is shown similar in most respects to circulator 600. However, circulator 700 includes two additional double refraction crystal plates 72 and 73 adjacent end-plates 21 and 25 respectively. Advantageously, by adding the double refraction crystal plates 72 and 73, ports 1 and 3 are disposed along the endface 10 along a same horizontal line, i.e. sharing the same Y-axis coordinate; thus the task of aligning the ports 1 and 3 and manufacturing the device becomes simplified.

The operation of the circulator 700 is similar in many respects to that of circulator 600 however, crystal plates 72 and 73 perform additional shifting. The states of polarization from ports 1 to 2 and 2 to 3 are illustrated in FIGS. 7b and 7c respectively the dimensions of the crystal plates 21, 72, 63a, 63b, 73, and 25 are such that a=b=e=f and d=c.

Of course, numerous other embodiments may be envisaged, without departing from the spirit and scope of the invention. For example the device in accordance with this invention can be manufactured having more than three ports.

What I claim is:

1. An optical circulator for transmitting lights from incoming and outgoing ports circularly, comprising:

a first dividing and combining means for dividing a beam into two beams of orthogonal electric field vectors and for combining two beams from different paths into one on the same path;

a pair of beam path determining means adjacently coupled for introducing a beam to a different direction depending on the direction of the electric field vector and the propagation, each means in said pair being substantially identical but oppositely oriented, such that the pair of means have opposite beam shifting directions;

a second dividing and combining means for dividing a beam into two beams of orthogonal electric field vectors and for combining two beams of orthogonal electric field vectors from different paths into one on the same path, said first dividing and combining means, said beam path determining means and said second dividing and combining means being optically coupled to allow light to propagate from the first dividing and combining means to the beam path determining means and to the second dividing and combining means;

a first polarization rotation means between said first dividing and combining means and said beam path determining means for rotating two orthogonal polarization vectors in a same direction and maintaining an orthogonal relationship; and, a second polarization rotating means between said beam path determining means and said second dividing and combining means for rotating two orthogonal polarization vectors in a same direction to maintain thereby maintaining an orthogonal relationship.

2. An optical circulator as defined in claim 1, wherein the pair of beam path determining means is comprised of two oppositely oriented birefringent crystal plates, each having opposite beam shifted directions.

3. An optical circulator as defined in claim 2, wherein the first and second polarization rotation means are non-reciprocal rotators.

4. An optical circulator as defined in claim 3, wherein the non-reciprocal rotators comprise Faraday elements.

5. An optical circulator as defined in claim 2, wherein the first dividing and combining means comprise double refraction crystal plates.

6. An optical circulator as defined in claim 5, further comprising a reciprocal rotating element disposed between one of the first and second dividing and combining means and the pair of substantially identical oppositely oriented birefringent crystal plates.

7. An optical circulator as defined in claim 2, wherein the pair of substantially identical oppositely oriented birefringent crystal plates are oriented to shift one of two orthogonally polarized beams in a first direction and the other of the two orthogonally polarized beams in a second direction.

8. An optical circulator as defined in claim 2, comprising a second pair of substantially identical oppositely oriented birefringent crystal plates disposed between said first pair of birefringent crystal plates and one of said first and second polarization rotating means, said first pair and said second pair of birefringent plates being substantially identical.

9. An optical circulator as defined in claim 8 comprising means for rotating incoming light by 90 degrees, said means disposed between said first and second pair of birefringent crystal plates.

10. An optical circulator as defined in claim 9, further comprising a pair of birefringent crystals, a first crystal of the pair being adjacent to the first dividing and combining means and the second crystal of said pair being adjacent to the second dividing and combining means, said pair of crystals for further shifting redirecting light in such as manner as to align incoming and outgoing light at one end of the circulator at different ports that are aligned with one of a horizontal and vertical axis of the device.

11. An optical circulator, comprising:

first and second non-reciprocal polarization elements having first and second side surfaces;

a first birefringent crystal having first and second side surfaces, the second side surface being disposed against the first side surface of the first non-reciprocal polarization element;

a second birefringent crystal having first and second side surfaces, the second side surface being disposed against the first side surface of the second non-reciprocal polarization element; and first beam path determining means adjacently coupled for introducing a beam to a different direction depending on the direction of the electric field vector and the propagation, said beam path determining means being comprised of substantially identical but oppositely oriented birefringent crystals for beam shifting in opposite directions, said crystals having endfaces being disposed between second side surfaces of the first and second non-reciprocal polarization elements, wherein light propagates through from a first port on the first side of the first birefringent crystal to a second port on the first side of the second birefringent crystal, and wherein light propagates through from a second port on the first side of the second birefringent crystal to a third port on the first side of the first birefringent crystal.

12. An optical circulator comprising:

first means for separating a beam of light into two polarized beams having orthogonal polarization states, and for combining two separated orthogonally polarized beams; second means for separating a beam of light into two polarized beams having orthogonal polarization states, and for combining two separated orthogonally polarized beams; a pair of substantially identical oppositely oriented birefringent crystal plates oriented to shift one of two orthogonally polarized beams in a first direction and the other of the two orthogonally polarized beams in a second direction, said means being disposed intermediate the first and second separating and combining means; and, a pair of non-reciprocal polarization rotating means, one means in said pair being disposed between the pair of birefringent crystal plates and one of said separating and combining means, the other means in said pair of non-reciprocal polarization rotating means being disposed between the other of said separating and combining means and said pair of birefringent crystal plates.

\* \* \* \* \*